United States Patent [19]
Johnson et al.

[11] 3,735,594
[45] May 29, 1973

[54] SCAVENGER SYSTEM FOR INDUSTRIAL ENGINES

[76] Inventors: James D. Johnson; Laurren C. Edwards, Sr., both of Box 898, Pecos, Tex. 79772

[22] Filed: May 17, 1971

[21] Appl. No.: 143,806

[52] U.S. Cl................................60/319, 417/159
[51] Int. Cl.................................................F01n 5/04
[58] Field of Search................60/39.23, 290, 289, 60/319, 317, 262, 264, 322, 39.32; 417/183, 187, 188, 189, 157, 159, 158; 239/515; 123/41.64

[56] References Cited
UNITED STATES PATENTS

| | | | |
|---|---|---|---|
| 3,457,724 | 7/1969 | Gandy et al. | 60/317 |
| 3,254,483 | 6/1966 | Martin et al. | 417/183 X |
| 864,969 | 9/1907 | Kenerson et al. | 417/187 X |
| 2,778,192 | 1/1957 | Kroon | 60/39.32 |
| 553,454 | 1/1896 | Dosch et al. | 239/515 X |

*Primary Examiner*—Carlton R. Croyle
*Assistant Examiner*—Michael Koczo, Jr.
*Attorney*—Marcus L. Bates

[57] ABSTRACT

An exhaust scavenger system associated with industrial internal combustion engines for scavenging the atmosphere in vicinity of the engine and transporting any combustibles to a remote location. The system includes an elongated tubular housing having a concentrically arranged exhaust pipe affixed therein, with means for regulating the mass flow of gases ingested through the annulus formed between the exhaust pipe and its housing.

A gas deflector means is affixed to the terminal end of the exhaust pipe and located within the housing so as to increase the efficiency of the scavenging action of the apparatus.

7 Claims, 6 Drawing Figures

PATENTED MAY 29 1973
3,735,594
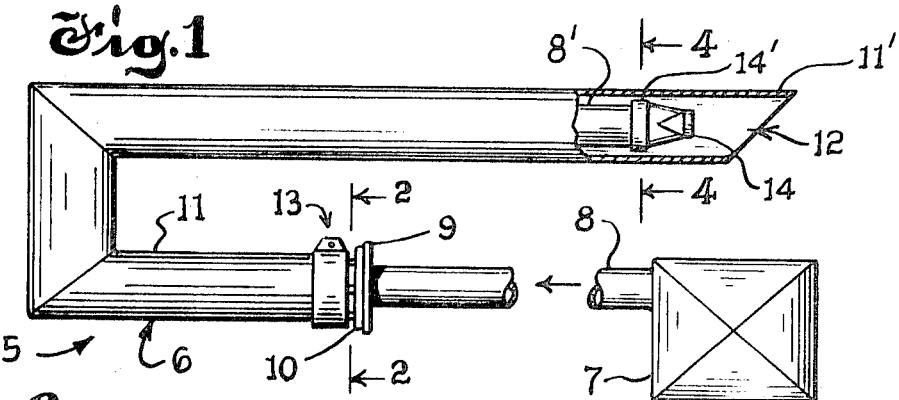
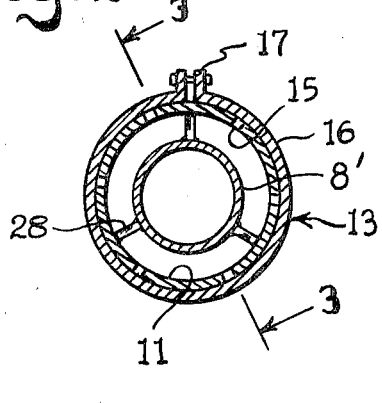
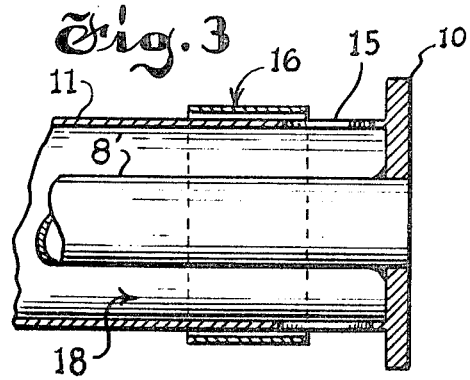
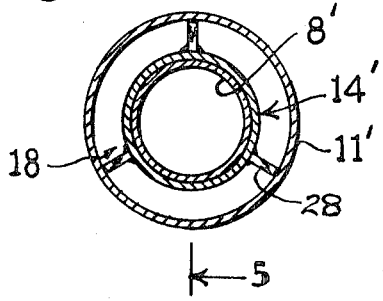
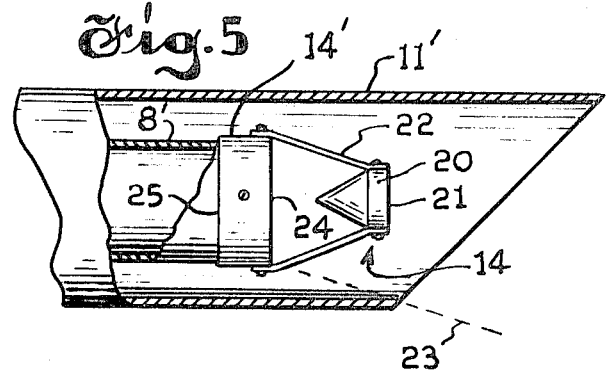
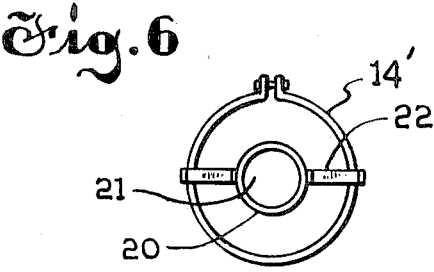
INVENTORS
JAMES D. JOHNSON AND
LAURREN C. EDWARDS, SR
BY
MARCUS L. BATES
THEIR AGENT

SCAVENGER SYSTEM FOR INDUSTRIAL ENGINES

BACKGROUND OF THE INVENTION

Exhaust systems for heavy industrial engines have a short life expectancy for the reason that they are subjected to the deleterious effects of the atmosphere as well as exceedingly high temperatures. Where a stationary engine is located within an enclosure and the exhaust system must convey the exhaust gases from the engine to a location externally of the enclosure, the external portion of the exhaust system is exposed to moisture while the remaining portion of the exhaust system located within the enclosure is subjected to the various undesirable gaseous atmosphere that may be contained therewithin.

It is advantageous that an exhaust system of the scavenger type be utilized to scavenge combustibles and other undesirable gases from close proximity of the engine so as to preclude the presence of an explosive or otherwise objectionable type atmosphere. It is desirable that such a system have means associated therewith for adjusting the scavenging action of the system to enable it to realize its most efficient flow configuration.

It is furthermore desirable that such a system have means incorporated therewith for transferring heat from between the housing and the exhaust pipe, and into the gases flowing through the annulus therebetween so as to protect the exhaust system from stresses and strains associated with temperature changes in the structure thereof.

Throughout this disclosure, the term "IC" is intended to relate to any internal combustion engine and especially to large internal combustion engines of the stationary type.

SUMMARY OF THE INVENTION

This invention relates to an exhaust scavenging system for IC engines comprised of an elongated tubular housing having a marginal end portion thereof disposed within an enclosure and in close proximity of an IC engine with the housing leading externally outwardly of the enclosure. An exhaust pipe connected to the IC engine is concentrically disposed within the housing so as to provide an annulus between the exhaust pipe and the housing.

The inlet end of the housing has adjustable means associated therewith for controllably ingesting the atmosphere in proximity of the engine, while the marginal terminal outlet end of the housing has included therein and associated with the terminal end of the exhaust pipe a deflector means for increasing the efficiency of the scavenging action of the system.

Therefore, a primary object of this invention is to provide improvements in exhaust scavenging systems for IC engines.

Another object of the invention is to provide means by which the scavenging action of an exhaust scavenging system can be improved.

A further object of this invention is to provide apparatus for increasing the scavenging action of an exhaust scavenger system for IC engines.

These and various other objects and advantages of this invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a broken, part cross-sectional, part schematical view of an exhaust scavenger system made in accordance with the present invention;

FIG. 2 is an enlarged part cross-sectional view taken along line 2—2 of FIG. 1;

FIG. 3 is a broken part cross-sectional view of a portion of the apparatus disclosed in FIG. 1;

FIG. 4 is an enlarged cross-sectional view taken along line 4—4 of FIG. 1;

FIG. 5 is a broken part cross-sectional view taken along line 5—5 of FIG. 4; and FIG. 6 is an end view of part of the apparatus disclosed in FIG. 1.

DETAILED DESCRIPTION OF THE PREFERRED EMBODIMENT

In FIG. 1 there is disclosed an exhaust scavenger system, generally indicated by the arrow at numeral 5, which can be used in conjunction with any number of industrial IC (internal combustion) engines. The system includes a combination of different elements, which in its entirety is generally indicated by the arrow at numeral 6, and which can be flow connected to the schematically illustrated IC engine 7. Exhaust pipe 8 delivers hot exhaust gases from the engine, and preferably is flanged at the inlet terminal end thereof, as generally indicated by numeral 9. Flange 10 is bolted to flange 9 in the usual manner and defines the inlet end of the system. Attached to Flange 10 is a tubular housing 11 which receives two 90° bends so as to dispose the outlet end 11' of the housing at an elevation located considerably above the inlet end. The temperature of the exhaust gases emerging from the system at 12 is considerably cooler than the temperature of the gases entering at 8 for reasons which will be better appreciated later on in this disclosure.

As seen in the remaining figures, in conjunction with FIg. 1, an adjustable air intake assembly, generally indicated by the arrow at numeral 13, is disposed at the inlet end of the tubular housing, while an exhaust gas deflector means 14 is disposed at the outlet terminal end of the exhaust pipe 8'. Radial air intake ports 15 are circumferentially disposed about the tubular housing adjacent to but spaced apart from the flange. A circumferentially extending skirt 16, having friction locking means 17 thereon, is slidably received about the outer peripheral wall surface which forms a marginal end portion of the inlet end of the housing, and in a manner to enable the skirt to be slidably superimposed upon the radial ports in a telescoping manner.

As particularly seen in FIGS. 3 and 4, the concentrically arranged exhaust pipe cooperates with the interior of the housing to form an elongated longitudinally extending annular area 18 through which the scavenged gases are forced to flow.

As best seen illustrated in FIGS. 5 and 6, the before mentioned gas deflector means includes a cone shaped member 20 having a base 21 opposed to the apex thereof. The apex of the cone is arranged in spaced apart relationship with respect to the terminal end of exhaust pipe 8' by means of a number of spaced apart arms 22. The outlet end of the exhaust pipe is preferably adjustably arranged with respect to the outlet end of the housing so as to provide an angle at 23 which is complementary to the angle formed by the side walls of the cone. The slidably band 14' has spaced apart edge portion 24 and 25 which can be moved relative to the terminal end of the exhaust pipe so as to achieve the most optimum positioning of the cone relative to the outlet end of the housing and the concentric exhaust pipe. Any suitable fastener means can be used to affix the slidable band to the marginal terminal end of the exhaust pipe.

A multiplicity of metal members 28 are radially spaced apart 120° with respect to one another and placed in spaced apart planes along the pipe annulus. The innermost end portion of each member is welded to the outer peripheral surface of the exhaust pipe while the remaining free end portion is slidably received in close tolerance relationship with respect to the inside peripheral wall surface of the housing so as to maintain the longitudinal axis of the exhaust pipe and the housing arranged along a common longitudinal axis. This expedient facilitates assembly of the apparatus while at the same time promotes heat transfer between the exhaust pipe and the housing.

In operation, the IC engine delivers exhaust gases at 8 in the usual manner. The hot exhaust gases flow through the central aperture located in the flanges 9 and 10, along the passageway within exhaust pipe 8', where the exhaust gases ultimately impinge upon the deflector means.

The deflector causes the emerging exhaust gases to change direction of flow relative to the longitudinal central axis of the concentrically arranged pipes to thereby increase the velocity of the gases flowing about the cone annulus. A change in kinetic energy occurs between the exhaust gases and the scavenged gases, with some energy from one gas being transferred into the other, to thereby cause the scavenged gases to more efficiently flow through the annulus. The scavenged gas is admixed with the exhaust gases within the marginal end portion of the housing. The action of the cone relative to the exhaust gas and the scavenged gas represents very little pressure drop in the exhaust gas manifold as compared to an open-ended system.

The flow path of the scavenged gases can be traced from their initial entrance into the radial intake ports, through the longitudinal extending annular area, and into proximity of the cone. As the scavenged gases flow through the annular area, the stand-offs 28 absorb heat energy from the exhaust pipe by both convection and conduction and transfer the heat energy into the scavenged gases as well as into the housing. Moreover, the scavenged gases contact the outer peripheral wall surface of the exhaust pipe and the inner peripheral wall surface of the housing so as to continuously and uniformly reduce the temperature of the exhaust gases and exhaust pipe while the temperature of the scavenged gases as well as the housing is raised. The exterior surface of the housing looses heat energy to the ambient through convection and radiation.

The housing remains at a fairly low temperature adjacent to the inlet flange so that should one physically contact the exhaust system they will not be seriously injured. The exhaust pipe is protected from moisture as well as other undesirable ambient conditions. Since the exhaust pipe is isolated by the housing, at constant power settings it is maintained at a constant temperature. This expedient reduces stresses and strains which would otherwise be imposed therein due to continual changes in climatic and wind conditions. The atmospheric area in the vicinity of the engine is continuously exhausted to a location externally of the enclosure which houses the engine, and accordingly dangerous vapors and fumes, such as explosive hydrocarbons and the like which would otherwise accumulate therein, are expelled from the enclosure.

It should be noted that edge portion 24 of band 14' essentially defines the effective terminal end of the exhaust pipe. The band must be sufficiently wide enough to enable slidably movement of the cone assembly towards the outlet end of the housing to achieve the maximum flow rate of scavenged gases through the system while suffering a minimum pressure drop at the engine exhaust manifold.

Satisfactory operation has been realized under the following conditions: a 4 inch diameter exhaust pipe; an 8¾ inch diameter housing; radial intake port area 50 square inches; cone cross-sectional area at base 11 square inches; cone apex 60°; cone apex spaced apart from edge portion 24 by 2 inches. Various lengths of the system illustrated in FIG. 1: 2 feet 3 inches; 3 feet; and 12 feet respectively, beginning at the flange.

Portion 11 of the tubular housing may be provided with still another flange which can be supported by a wall of an enclosure means within which the IC engine may be located.

I claim:

1. Exhaust scavenger system for industrial internal combustion engines comprising:

an elongated tubular housing, an exhaust pipe; means forming an air intake port; and means forming an exhaust gas deflector;

said elongated tubular housing having an inlet end and an outlet end; said exhaust pipe having an inlet end and an outlet end with said inlet end adapted to be connected to the exhaust manifold of an internal combustion engine; said exhaust pipe being concentrically arranged within and longitudinally disposed with respect to at least part of said housing;

said air intake port forming a marginal portion of the inlet end of said housing; said air intake port includes radially spaced apart apertures circumferentially disposed about said housing; and, means for regulating the effective area of the ports;

said gas deflector being affixed to the outlet end of said exhaust pipe and within and in close proximity to the outlet end of said housing; and means for supporting at least part of the weight of said exhaust pipe from said housing; said means for supporting said exhaust pipe from the interior of said housing includes spaced apart heat transferring rods;

said rods having one end portion thereof placed in slidable contact with the interior of said housing while the remaining end portion thereof is attached to the exterior of said exhaust pipe.

2. The system of claim 1, and further including a flange; the inlet end of said exhaust pipe and said housing are attached to said flange; said flange having a centrally located aperture which forms the inlet end of said exhaust pipe;

said radially spaced apart apertures being circumferentially aligned with one another and further includes a circumferentially extending skirt slidably received about said housing so that the skirt can be moved to cover said apertures.

3. The system of claim 1, wherein said outlet is located above said inlet;

said gas deflector being a cone shaped member having a major diameter less than the internal diameter of said housing, said cone having the apex thereof concentrically arranged with respect to the exhaust pipe and located adjacent to and spaced apart from the exhaust pipe outlet; and means for adjusting the spaced apart distance of the cone relative to the exhaust pipe.

4. The system of claim 1, wherein said outlet is located above said inlet;

said gas deflector being a cone shaped member having a major diameter less than the internal diameter of said housing, said cone having the apex thereof concentrically arranged with respect to the exhaust pipe and located adjacent to and spaced apart from the exhaust pipe outlet; and means for adjusting the spaced apart distance of the cone relative to the exhaust pipe.

5. The system of claim 1, wherein said gas deflector includes means by which it is adjustably disposed in spaced apart relationship with respect to the exhaust outlet;

said deflector including a cone having an apex adjacent to said exhaust outlet and a base adjacent to said housing outlet; whereby:

said deflector causes exhaust gases to flow into close proximity of the interior wall surface of the housing at an area closely adjacent to the outlet end of the housing.

6. The system of claim 5 wherein said cone includes a base; a band, means by which said band is slidably received about a marginal terminal end of said exhaust pipe, and said means by which said gas deflector is adjustably disposed includes a plurality of members attached to said base and said band.

7. The system of claim 5 wherein the outlet end of said housing is formed into a peripheral edge portion which is disposed relative to the central longitudinal axis of the housing at an angle substantially less than 90°.

* * * * *